US012705788B2

(12) United States Patent
Jung et al.

(10) Patent No.: US 12,705,788 B2
(45) Date of Patent: Aug. 11, 2026

(54) METHOD AND APPARATUS WITH HEAT MAP-BASED POSE ESTIMATION

(71) Applicant: Samsung Electronics Co., Ltd., Suwon-si (KR)

(72) Inventors: Sangil Jung, Suwon-si (KR); Jiho Choi, Suwon-si (KR); Seungin Park, Suwon-si (KR); Hyeongseok Son, Suwon-si (KR); Byung In Yoo, Suwon-si (KR); Solae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 392 days.

(21) Appl. No.: 18/471,442

(22) Filed: Sep. 21, 2023

(65) Prior Publication Data

US 2024/0221208 A1 Jul. 4, 2024

(30) Foreign Application Priority Data

Dec. 29, 2022 (KR) ........................ 10-2022-0189363

(51) Int. Cl.
*G06T 7/73* (2017.01)

(52) U.S. Cl.
CPC ...... *G06T 7/73* (2017.01); *G06T 2207/20084* (2013.01); *G06T 2207/30196* (2013.01)

(58) Field of Classification Search
CPC ............. G06T 7/73; G06T 2207/20084; G06T 2207/30196; G06T 7/70; G06T 3/30453; G06T 5/50; G06T 7/11; G06T 7/20; G06N 3/04; G06N 3/0455; G06N 3/08; G06V 40/103; G06F 16/53
See application file for complete search history.

(56) References Cited

U.S. PATENT DOCUMENTS

| | | | | |
|---|---|---|---|---|
| 11,321,868 | B1 | 5/2022 | Akbas et al. | |
| 11,335,023 | B2 | 5/2022 | Khamis et al. | |
| 2019/0332866 | A1* | 10/2019 | Beall | H04N 23/698 |
| 2020/0090408 | A1* | 3/2020 | Virkar | G06T 15/04 |
| 2020/0197744 | A1* | 6/2020 | Schweighofer | A61B 5/1128 |
| 2020/0364509 | A1* | 11/2020 | Weinzaepfel | G06N 3/08 |
| 2021/0104067 | A1 | 4/2021 | Fu et al. | |
| 2021/0366146 | A1* | 11/2021 | Khamis | G06T 11/00 |
| 2022/0108468 | A1* | 4/2022 | Nakamura | G06T 7/73 |

(Continued)

FOREIGN PATENT DOCUMENTS

WO WO 2022/243739 A1 11/2022

OTHER PUBLICATIONS

Point-Set Anchors for Object Detection, Instance Segmentation and Pose Estimation. Wei et al. (Year: 2020).*

(Continued)

*Primary Examiner* — Delomia L Gilliard
(74) *Attorney, Agent, or Firm* — NSIP Law

(57) ABSTRACT

A processor-implemented method with pose estimation includes: receiving an image, instance queries for object identification, and joint queries for joint identification; generating first heat maps associated with objects and second heat maps associated with joints in parallel based on the image, the instance queries, and the joint queries; and estimating respective joint information of a plurality of objects included in the image by combining the first heat maps and the second heat maps.

20 Claims, 10 Drawing Sheets

(56) References Cited

U.S. PATENT DOCUMENTS

| | | | | |
|---|---|---|---|---|
| 2022/0254157 | A1 | 8/2022 | Fu et al. | |
| 2022/0277473 | A1 | 9/2022 | Inoshita et al. | |
| 2022/0301304 | A1* | 9/2022 | Hampali | G06N 3/045 |
| 2023/0419637 | A1* | 12/2023 | Liu | G06T 3/4007 |
| 2024/0233441 | A1* | 7/2024 | Wang | G06V 20/647 |

OTHER PUBLICATIONS

Human pose regression by combining indirect part detection and contextual information. Luvizon et al. (Year: 2019).*

QueryPose: Sparse Multi-Person Pose Regression via Spatial-Aware Part-Level Query. Xiao et al (Year: 2022).*

Carion, Nicolas, et al. "End-to-End Object Detection with Transformers." European conference on computer vision. Cham: Springer International Publishing, arXiv:2005.12872v3 [cs.CV] May 28, 2020., (26 pages).

Hampali, Shreyas, et al. "Handsformer: Keypoint Transformer for Monocular 3D Pose Estimation of Hands and Object in Interaction." arXiv:2104.146 39vl [cs.CV] Apr. 29, 2021, (15 pages).

Hampali, Shreyas, et al. "Keypoint Transformer: Solving Joint Identification in Challenging Hands and Object Interactions for Accurate 3D Pose Estimation." Proceedings of the IEEE/CVF Conference on Computer Vision and Pattern Recognition. 2022., (19 pages).

Shi, Dahu, et al. "End-to-End Multi-Person Pose Estimation with Transformers." Proceedings of the IEEE/CVF Conference on Computer Vision and Pattern Recognition. 2022., (10 pages).

Extended European search report issued on May 21, 2024, in counterpart European Patent Application No. 23214970.8 (10 pages).

Sun, Ke, et al. "Deep high-resolution representation learning for human pose estimation." *Proceedings of the IEEE/CVF conference on computer vision and pattern recognition*. 2019.

Cao, Zhe, et al. "Realtime multi-person 2d pose estimation using part affinity fields." *Proceedings of the IEEE conference on computer vision and pattern recognition*. 2017.

* cited by examiner

METHOD AND APPARATUS WITH HEAT MAP-BASED POSE ESTIMATION

CROSS-REFERENCE TO RELATED APPLICATIONS

This application claims the benefit under 35 USC § 119(a) of Korean Patent Application No. 10-2022-0189363, filed on Dec. 29, 2022 in the Korean Intellectual Property Office, the entire disclosure of which is incorporated herein by reference for all purposes.

BACKGROUND

1. Field

The following description relates to a method and apparatus with heat map-based pose estimation.

2. Description of Related Art

Techniques for estimating a pose of a person in an image may be used to implement person-centered artificial intelligence (AI) cameras. Person pose estimation techniques may be used in fields such as recognition of a behavior of a person, abnormal behavior detection, and AI trainers. A multi-person pose estimation technique is a technique for estimating the poses of multiple persons in one image.

A pose estimation technique may include an operation of estimating the positions of joints included in an image. Joints may be defined as significant positions of a person, such as the eyes, nose, shoulders, knees, and ankles. The number of joints to be estimated may vary depending on the pose estimation technique, and one using a Common Objects in Context (COCO) dataset may define and estimate "17" joints.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method with pose estimation includes: receiving an image, instance queries for object identification, and joint queries for joint identification; generating first heat maps associated with objects and second heat maps associated with joints in parallel based on the image, the instance queries, and the joint queries; and estimating respective joint information of a plurality of objects included in the image by combining the first heat maps and the second heat maps.

Each of the first heat maps may include information on positions of all joints of any one of the plurality of objects, and each of the second heat maps may include information on a position of a single joint included in any one of the plurality of objects.

The first heat maps and the second heat maps may correspond to two-dimensional images representing a probability that a joint is present at each pixel location.

The generating in parallel may include: generating an image feature based on the image; and generating output instance queries and output joint queries by inputting the image feature, the instance queries, and the joint queries to a transformer decoder.

Each of the output instance queries may include information on a single object identified in the image, and each of the output joint queries may include information on a single joint identified in the image.

Multi-head self-attention may be performed on the instance queries and the joint queries through the transformer decoder.

The transformer decoder may include a plurality of layers, and the instance queries and the joint queries may be gradually updated by sequentially passing through the plurality of layers to generate the output instance queries and the output joint queries.

The generating in parallel further may include: generating a high-resolution image feature based on the image feature; generating the first heat maps based on the high-resolution image feature and the output instance queries; generating the second heat maps based on the high-resolution image feature and the output joint queries; and generating an object score by scoring each of the output instance queries.

The estimating may include estimating the respective joint information of the plurality of objects by multiplying first heat maps having an object score greater than or equal to a threshold value by the second heat maps.

The joint information may include coordinates of a joint and a probability that a joint is present at the coordinates, and the pose estimation method further may include estimating poses of the plurality of objects included in the image based on coordinates of a joint having the probability greater than a threshold value.

In one or more general aspects, a processor-implemented method with pose estimation includes: receiving an image feature generated based on an image, instance queries for object identification, and joint queries for joint identification; generating output instance queries and output joint queries in parallel by inputting the image feature, the instance queries, and the joint queries to a transformer decoder; and estimating respective poses of a plurality of objects included in the image based on either one or both of the output instance queries and the output joint queries.

The transformer decoder may be trained based on first heat maps associated with objects and second heat maps associated with joints.

The first heat maps and the second heat maps may correspond to two-dimensional images representing a probability that a joint is present at each pixel location.

Each of the output instance queries may include information on a single object identified in the image, and each of the output joint queries may include information on a single joint identified in the image.

The estimating of the respective poses may include generating a box regression result and a pose regression result based on the output instance queries.

The estimating of the respective poses may include: generating a box regression result based on the output instance queries; and generating a pose regression result based on a combination of the output instance queries and the output joint queries.

The first heat maps may be generated based on the box regression result, the pose regression result, and a high-resolution image feature, and the second heat maps may be generated based on the high-resolution image feature and the output instance queries.

The estimating of the respective poses may include: generating a high-resolution image feature based on the image feature; generating first heat maps associated with objects based on the high-resolution image feature and the output instance queries; and generating second heat maps associated with joints based on the high-resolution image feature and the output joint queries.

The estimating of the respective poses further may include: estimating reference points based on the first heat maps; and generating a pose regression result based on the reference points, the output instance queries, and the output joint queries.

In one or more general aspects, an apparatus with pose estimation includes: one or more processors configured to: receive an image, instance queries for object identification, and joint queries for joint identification; generate first heat maps associated with objects and second heat maps associated with joints in parallel based on the image, the instance queries, and the joint queries; and estimate respective joint information of a plurality of objects included in the image by combining the first heat maps and the second heat maps.

Other features and aspects will be apparent from the following detailed description, the drawings, and the claims.

Figures 1A, 1B:
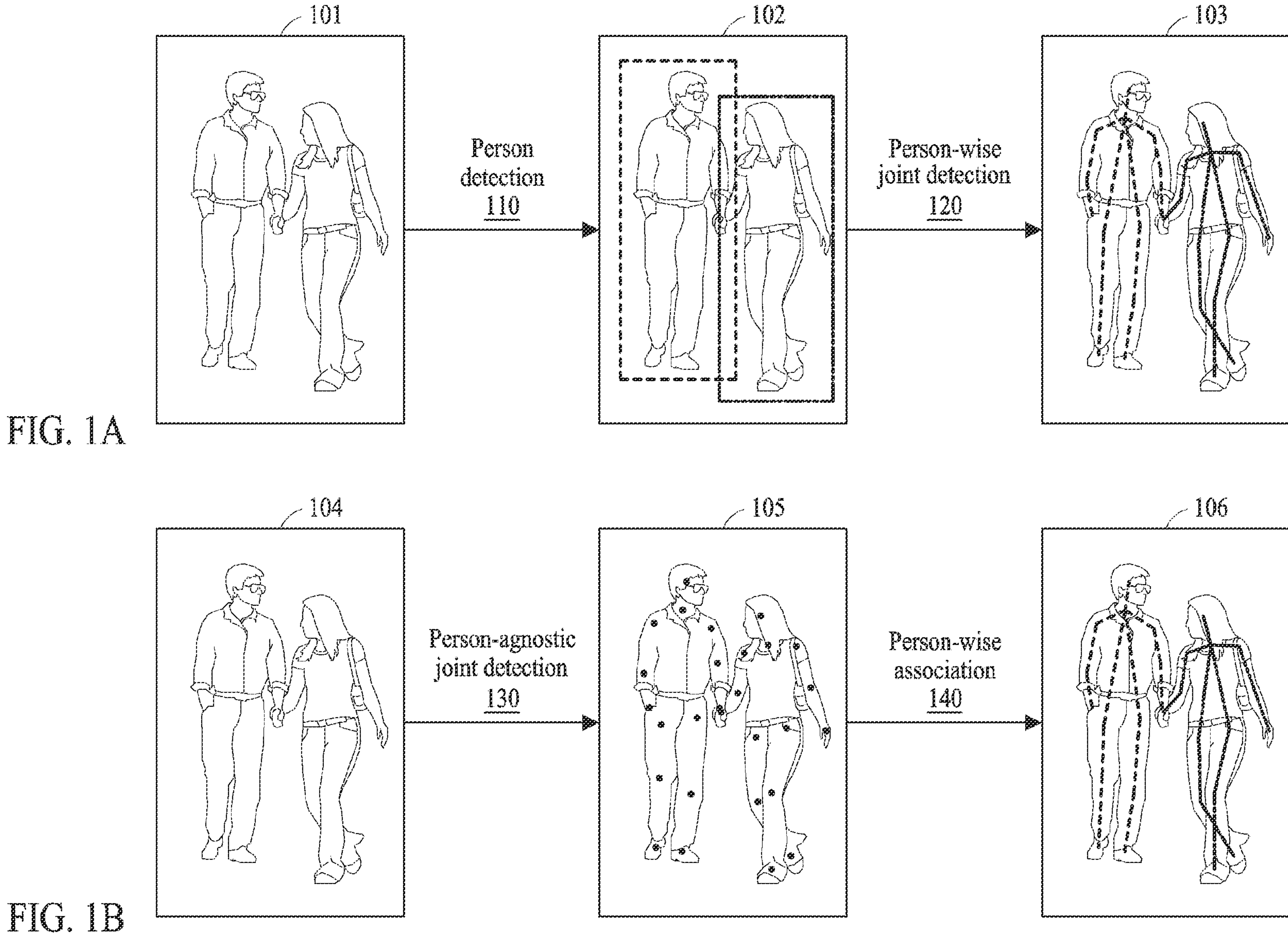
FIGS. 1A and 1B illustrate examples of methods with pose estimation.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the examples. The singular forms "a", "an", and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by those having ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Hereinafter, examples will be described in detail with reference to the accompanying drawings. When describing the examples with reference to the accompanying drawings, like reference numerals refer to like elements and a repeated description related thereto will be omitted.

FIGS. 1A and 1B illustrate examples of methods with pose estimation (e.g., pose estimation methods).

A pose estimation method (e.g., a multi-person pose estimation method) may include a top-down multi-person pose estimation method and a bottom-up multi-person pose estimation method.

Referring to FIG. 1A, an example of a top-down multi-person pose estimation method is shown. The top-down multi-person pose estimation method may include a two-step process (e.g., person detection and joint detection).

In operation 110, the top-down multi-person pose estimation method may include an operation of detecting a person in an image 101. A result of person detection may correspond to an image 102 including a plurality of bounding boxes (e.g., a plurality of bounding boxes respectively representing a plurality of person areas). The plurality of bounding boxes detected in operation 110 may be cropped (e.g., the bounding boxes may be extracted from the image).

In operation 120, the top-down multi-person pose estimation method may include an operation of estimating per-person poses based on the plurality of cropped bounding boxes (e.g., the plurality of bounding boxes respectively corresponding to a plurality of persons). A result of per-person pose estimation may correspond to an image 103. The result of per-person pose estimation may be obtained (e.g., generated) from a heat map (e.g., a heat map representing a probability that a joint is present at a predetermined position) based on a joint detection network input of a bounding box (e.g., a resized bounding box). A heat map may be a probability map indicating, for each pixel of the probability map, a probability that a joint is present at the pixel, according to non-limiting examples.

The top-down multi-person pose estimation method may crop and resize the person areas person-wise, and normalize the size of data input to a joint network. Since the top-down multi-person pose estimation method performs normalization, pose estimation may be performed with high accuracy even for a small person. However, the top-down multi-person pose estimation method may use a large amount of computation since the input of the joint network may increase as the number of persons increases (e.g., as the number of persons included in an image increases). Also, the performance of the top-down multi-person pose estimation method may be dependent on the performance of a person detector. For example, the person detector may have difficulties in detecting two persons severely occluded, which may affect the performance of the pose estimation method. The top-down multi-person pose estimation method may have limitations due to sequentially performing person detection and joint detection.

Referring to FIG. 1B, an example of a bottom-up multi-person pose estimation method is shown. The bottom-up multi-person pose estimation method may include a two-step process (e.g., joint detection and person-wise joint association).

In operation 130, the bottom-up multi-person pose estimation method may include an operation of estimating a heat map corresponding to a person-agnostic joint type in an image 104. A result of heat map estimation may correspond to an image 105.

In operation 140, the bottom-up multi-person pose estimation method may include an operation of obtaining a result of per-person pose estimation by associating estimated joints person-wise. In order to associate joints person-wise, a process of separately learning the relationship between the joints may be performed. The bottom-up multi-person pose estimation method may associate joints person-wise through a matching algorithm (e.g., a graph matching algorithm). A result of per-person pose estimation may correspond to an image 106.

The bottom-up multi-person pose estimation method may have an amount of computation independent of the number of persons, and have a fast inference speed. However, the bottom-up multi-person pose estimation method may use additional information (part affinity field, segmentation, etc.) as an input to associate joints. In addition, the bottom-up multi-person pose estimation method may have lower accuracy than the top-down multi-person pose estimation method due to performing the joint association process as post-processing. Similar to the top-down multi-person pose estimation method, the bottom-up multi-person pose estimation method may include sequential/dependent inference of two steps (e.g., joint-wise heat map estimation and per-person pose estimation through association).

Figure 2:
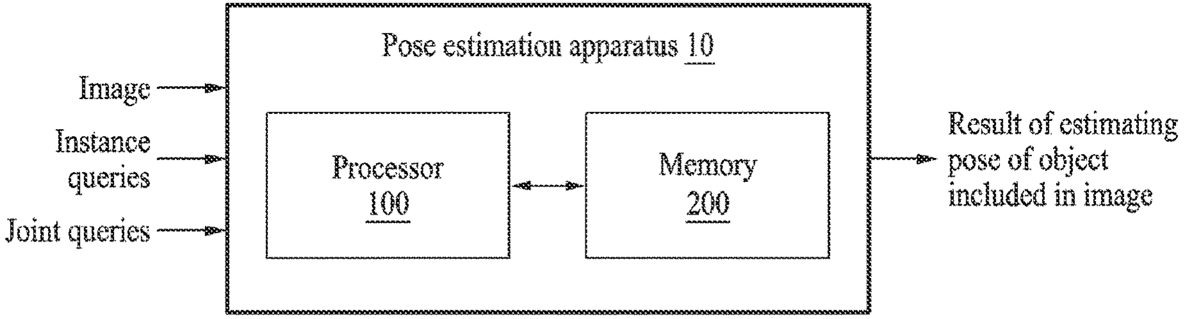
FIG. 2 illustrates an example of an apparatus with pose estimation.
Figure 3:
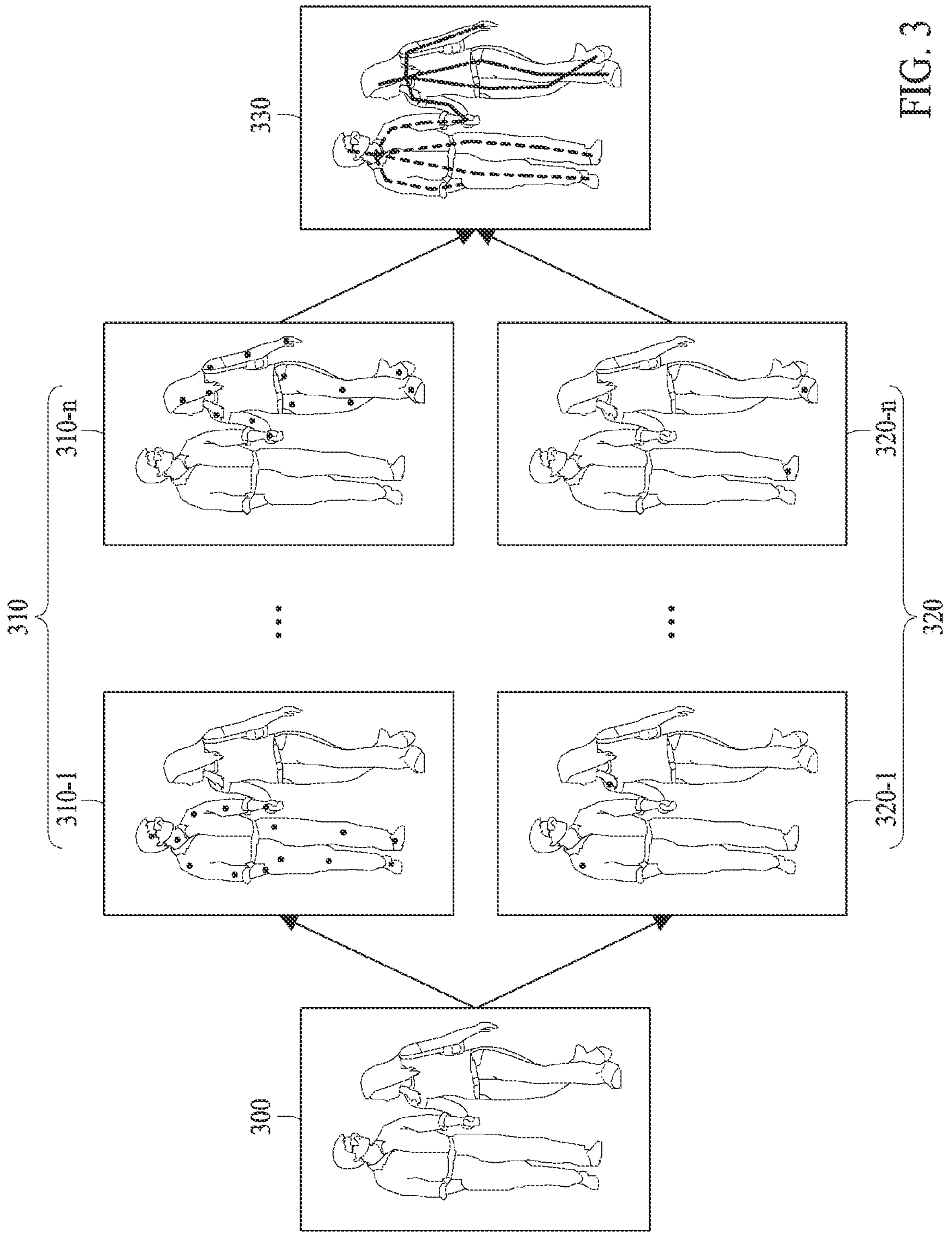
FIG. 3 illustrates an example of a method with pose estimation.

FIG. 2 illustrates an example of an apparatus with pose estimation (e.g., a pose estimation apparatus), and FIG. 3 illustrates an example of a method with pose estimation (e.g., a pose estimation method).

Referring to FIG. 2, a pose estimation apparatus 10 may estimate poses of objects (e.g., persons) included in an image. The pose estimation apparatus 10 may estimate the respective poses of the objects included in the image, based on the image, instance queries (e.g., instance queries involved in identifying objects), and joint queries (e.g., joint queries involved in identifying joints included in an object).

The pose estimation apparatus 10 may estimate the poses of the plurality of objects in a single-shot manner, using a first heat map and a second heat map estimated in parallel. The pose estimation apparatus 10 of one or more embodiments may use the first heat map and the second heat map estimated in parallel, thereby breaking from sequential/dependent estimation of two steps (e.g., object-wise estimation and joint-wise estimation). Examples of heat maps used by the pose estimation apparatus 10 are shown in FIG. 3 (e.g., 310 and 320).

The pose estimation apparatus 10 may estimate a pose using a neural network. The neural network may be a general model that has the ability to solve a problem, where nodes forming the network through synaptic combinations change a connection strength of synapses through training.

A node of the neural network may include a combination of weights or biases. The neural network may include one or more layers, each including one or more nodes. The neural network may infer a result from a predetermined input by changing the weights of the nodes through training.

The neural network may include a deep neural network (DNN). The neural network may include a convolutional neural network (CNN), a recurrent neural network (RNN), a perceptron, a multilayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and/or an attention network (AN). Examples of the structure of the neural network implemented in the pose estimation apparatus 10 will be described in detail with reference to FIGS. 4 to 9.

The pose estimation apparatus 10 may be, or be implemented in, a personal computer (PC), a data server, and/or a portable device.

The portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, and/or a smart device. The smart device may be implemented as a smart watch, a smart band, and/or a smart ring.

The pose estimation apparatus 10 may include a processor 100 (e.g., one or more processors) and a memory 200 (e.g., one or more memories).

The processor 100 may process data stored in the memory 200. The processor 100 may execute a computer-readable code (for example, software) stored in the memory 200 and instructions triggered by the processor 100. For example, the memory 200 may include a non-transitory computer-readable storage medium storing instructions that, when executed by the processor 100, configure the processor 100 to perform any one, any combination, or all of the operations and methods described herein with reference to FIGS. 1-11.

The processor 100 may be a hardware-implemented data processing device having a circuit that is physically structured to execute desired operations. The desired operations may include, for example, codes or instructions included in a program.

The hardware-implemented data processing device may include, for example, a microprocessor, a central processing unit (CPU), a processor core, a multi-core processor, a multiprocessor, an application-specific integrated circuit (ASIC), and/or a field-programmable gate array (FPGA).

The memory 200 may be implemented as a volatile memory device or a non-volatile memory device.

The volatile memory device may be implemented as a dynamic random-access memory (DRAM), a static random-access memory (SRAM), a thyristor RAM (T-RAM), a zero capacitor RAM (Z-RAM), and/or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), and/or an insulator resistance change memory.

Referring to FIG. 3, the pose estimation apparatus 10 may obtain a pose estimation result 330 of estimating poses of objects included in an image 300 using two different heat maps 310 and 320. The two different heat maps may include first heat maps 310 associated with objects and second heat maps 320 associated with joints.

The first heat maps 310 and the second heat maps 320 may correspond to two-dimensional images representing a possibility or probability that a joint is present at each pixel location.

Each of the first heat maps 310 may include information on positions of all joints of any one of a plurality of objects (e.g., a plurality of objects included in an image). For example, a first heat map 310-1 may include information on positions of all joints of a person on the left in the image 300, and a first heat map **310-*n* may include information on positions of all joints of a person on the right in the image 300. Each of the first heat maps 310** may include information of a single object.

Each of the second heat maps 320 may include information on positions of single joints respectively included in the plurality of objects (e.g., the plurality of objects included in the image). For example, a second heat map 320-1 may include information on positions of the right shoulders of all persons in the image 300, and a second heat map **320-*n* may include information on positions of the right ankles of all persons in the image 300. Each of the second heat maps 320** may include information on a single joint.

The first heat maps 310 and the second heat maps 320 may be estimated in parallel. The pose estimation apparatus 10 of one or more embodiments may estimate the poses of the plurality of objects in a single-shot manner, using the first heat maps 310 and the second heat maps 320 estimated in parallel. The pose estimation apparatus 10 of one or more embodiments may use the first heat maps 310 and the second heat maps 320 estimated in parallel, thereby breaking from sequential/dependent estimation of two steps (e.g., object-wise estimation and joint-wise estimation).

The first heat maps 310 and the second heat maps 320 may be mutually optimized. The pose estimation apparatus 10 may perform pose estimation robust against occlusion by utilizing the mutually optimized first heat maps 310 and second heat maps 320.

The pose estimation apparatus 10 may directly or indirectly utilize the first heat maps 310 and the second heat maps 320 for pose estimation.

The pose estimation apparatus 10 may estimate joint information of the objects by combining the first heat maps 310 and the second heat maps 320. An example of directly utilizing the first heat maps 310 and the second heat maps 320 will be described in detail with reference to FIGS. 4 and 5.

The pose estimation apparatus 10 may output a pose regression result from an output of a decoder trained based on the first heat maps 310 and the second heat maps 320. An example of indirectly utilizing the first heat maps 310 and the second heat maps 320 will be described in detail with reference to FIGS. 6 to 9.

Figure 4:
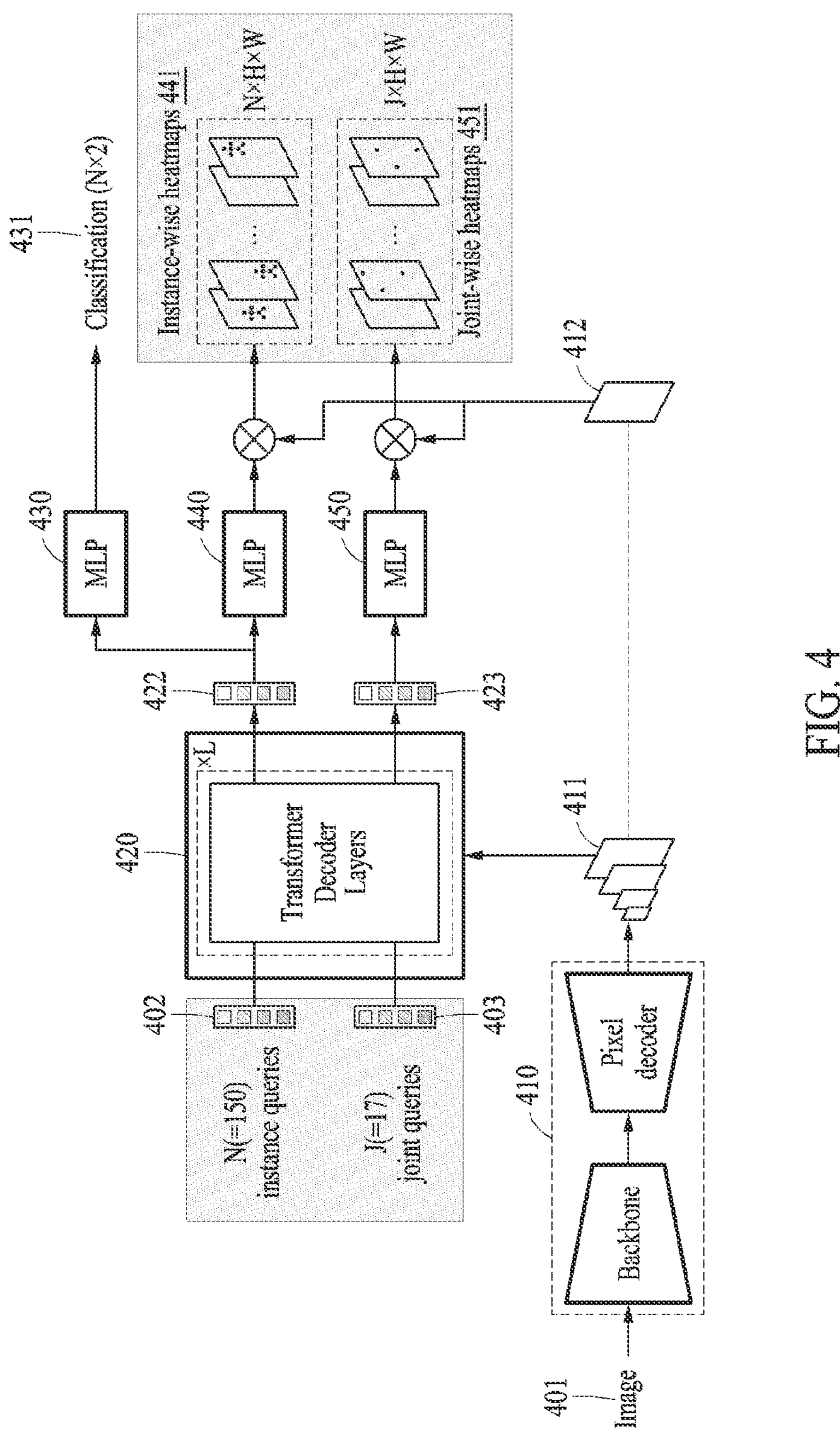
FIGS. 4 and 5 illustrate an example of a neural network-based method with pose estimation.
Figure 5:
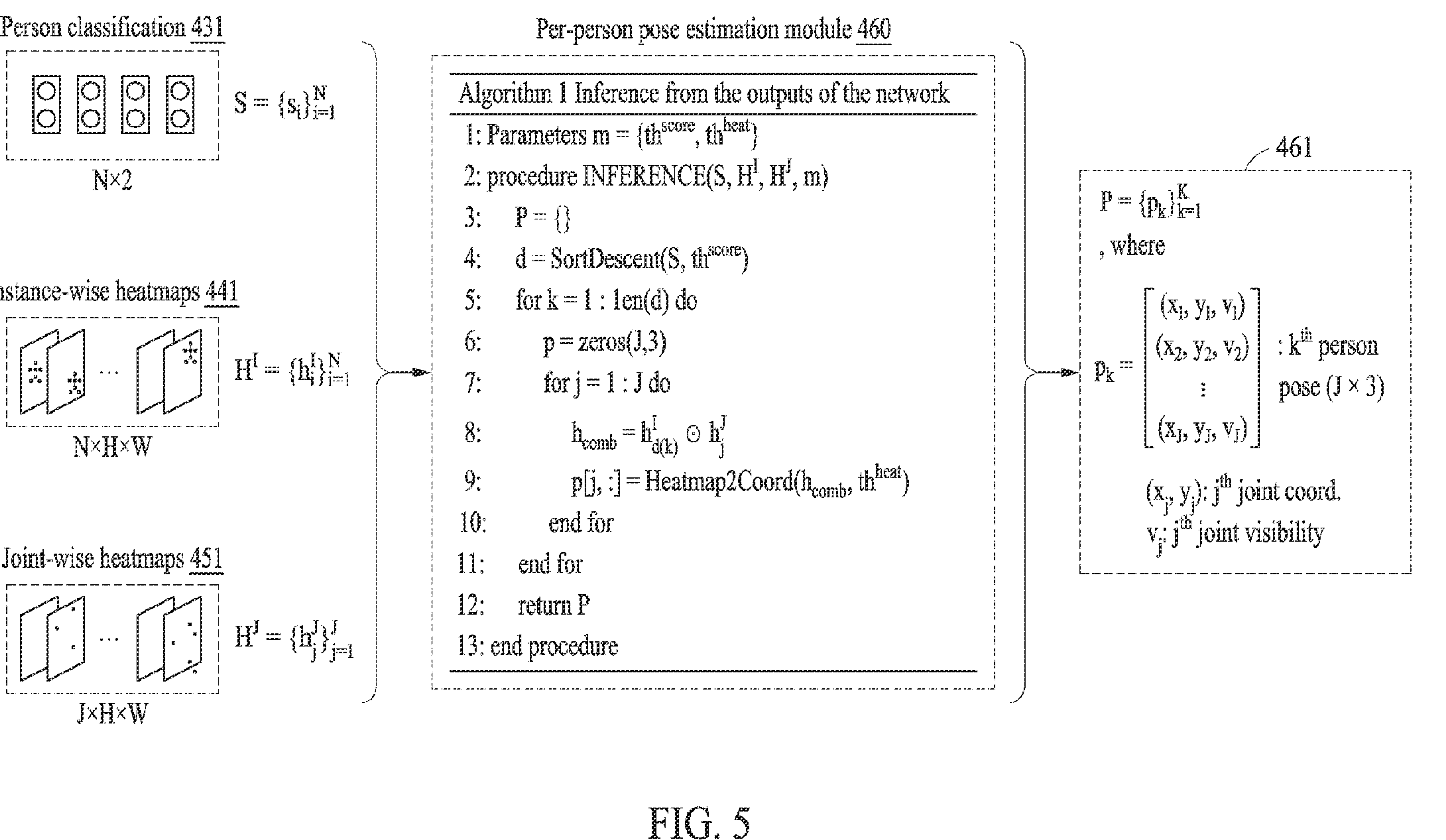

FIGS. 4 and 5 illustrate an example of a neural network-based method with pose estimation (e.g., a neural network-based pose estimation method).

Referring to FIG. 4, a processor (e.g., the processor 100 of FIG. 2) may obtain first heat maps 441 associated with objects and second heat maps 451 associated with joints in parallel, based on an image 401, instance queries 402, and joint queries 403.

The processor 100 may obtain image features 411 from the image 401 based on a module 410.

The processor 100 may obtain output instance queries 422 and output joint queries 423 by inputting the image features 411, the instance queries 402, and the joint queries 403 to a transformer decoder 420. The queries 402, 403, 422, and 423 shown in FIG. 4 may be object queries. The object queries may be queries used in detection with transformer (DETR). The object queries may correspond to object classes to be predicted by DETR.

The instance queries 402 may be queries involved in identifying objects. A single instance query may be involved in identifying a single object. Although FIG. 4 shows that "150" instance queries 402 are input to the transformer decoder 420, examples are not limited thereto. The "150" instance queries 402 may be involved in identifying up to "150" objects in the image 401. Even when the number of objects identified in the image 401 is less than "150", the "150" instance queries 402 may be transformed into "150" output instance queries 422 by passing through the transformer decoder 420.

The joint queries 403 may be queries involved in identifying joints included in an object. A single joint query may be involved in identifying a single joint. Although FIG. 4 shows that "17" joint queries 403 are input to the transformer decoder 420, examples are not limited thereto. The "17" joint queries 403 may be involved in identifying up to "17" joints within the image 401. Even when the number of joints identified in the image 401 is less than "17", the "17" joint queries 403 may be transformed into "17" output joint queries 423 as passing through the transformer decoder 420.

The transformer decoder 420 may include a configuration corresponding to a decoder of DETR. Multi-head self-attention may be performed on the instance queries 402 and the joint queries 403 through the transformer decoder 402.

The transformer decoder 420 may include a plurality of layers (e.g., L layers). The instance queries 402 and the joint queries 403 may be gradually updated by sequentially passing through the plurality of layers until the output instance queries 422 and output joint queries 423 are output.

The processor 100 may obtain the output instance queries 422 and the output joint queries 423 from the image features 411, the instance queries 402, and the joint queries 403 based on the transformer decoder 420.

Each of the output instance queries 422 may include information on a single object identified in the image 401. To prevent the output instance queries 422 from being duplicated, bi-partite matching may be performed on the output instance queries 422.

Each of the output joint queries 423 may include information on a single joint identified in the image 401. To prevent the output joint queries 423 from being duplicated, bi-partite matching may be performed on the output joint queries 423.

The processor 100 may obtain the first heat maps 441 associated with objects and the second heat maps 451 associated with joints in parallel, based on high-resolution image features 412 (e.g., high-resolution image features 412 obtained based on the image features 411), the output instance queries 422, and the output joint queries 423.

The processor 100 may transform the output instance queries 422 based on a multi-layer perceptron (MLP) 440. The input and output of the MLP 440 may have the same dimensions. The processor 100 may obtain the first heat maps 441 based on the transformed output instance queries and the high-resolution image features 412. Each of the first heat maps 441 may include information on positions of all joints of any one of the plurality of objects in the image 401 (e.g., the first heat maps 310 of FIG. 3). The first heat maps 441 may correspond to two-dimensional images representing a possibility or probability that a joint is present at each pixel location. The first heat maps 441 may be instance-wise heat maps. The number of first heat maps 441 may be equal to the number of instance queries 402 (N=150).

The processor 100 may transform the output joint queries 423 based on an MLP 450. The input and output of the MLP 450 may have the same dimensions. The processor 100 may obtain the second heat maps 451 based on the transformed output joint queries and the high-resolution image features 412. Each of the second heat maps 451 may include information on positions of single joints respectively included in the plurality of objects in the image 401 (e.g., the second heat maps 320 of FIG. 3). The second heat maps 451 may correspond to two-dimensional images representing a possibility or probability that a joint is present at each pixel location. The second heat maps 451 may be joint-wise heat maps. The number of second heat maps 451 may be equal to the number of joint queries 403 (J=17).

The processor 100 of one or more embodiments may estimate the first heat maps 441 and the second heat maps 451 in parallel, thereby improving pose estimation technology by reducing the amount of computation (e.g., estimate N+J heat maps, rather than N*J heat maps).

The processor 100 may score each of the output instance queries 422 based on an MLP 430. Object scores 431 may be obtained by the scoring of the output instance queries 422. An object score may be a score indicating the degree to which the result output from the transformer decoder 420 is recognized as a person. The number of object scores 431 may be equal to the number of instance queries 402 (N=150). The number of object scores 431 may be equal to the number of first heat maps 441 (N=150).

Referring to FIG. 5, the processor 100 may estimate respective joint information 461 of the plurality of objects included in the image 401, based on the object scores 431, the first heat maps 441, and the second heat maps 451. The processor 100 may obtain the joint information 461 based on a pose estimation module 460.

For example, the processor 100 may multiply first heat maps having an object score greater than or equal to a threshold value, among the first heat maps 441, by the second heat maps 451. By performing the multiplication, the processor 100 may obtain the joint information 461.

The joint information 461 may include coordinates (x, y) of joints and a probability v that a joint is present at the coordinates. The number of joint information 461 may be equal to the number of first heat maps having an object score greater than or equal to the threshold value (e.g., the number of joint information 461≤N). The number of coordinates (x, y) of joints may be the same as the number of second heat maps 451 (e.g., J=17). The processor 100 may estimate the poses of the plurality of objects included in the image 401, based on coordinates of a joint having the probability v greater than a threshold value (e.g., display only coordinates of a joint having the probability v greater than the threshold value).

The processor 100 may estimate the poses of the plurality of objects in a single-shot manner, using the first heat maps 441 and the second heat maps 451 estimated in parallel. The processor 100 of one or more embodiments may use the first heat maps 441 and the second heat maps 451 estimated in parallel, thereby improving pose estimation technology by breaking from sequential/dependent estimation of two steps (e.g., object-wise estimation and joint-wise estimation).

The processor 100 may perform pose estimation robust against occlusion by utilizing the mutually optimized first heat maps 441 and second heat maps 451. As described above, referring to FIGS. 4 and 5, the processor 100 may directly utilize the first heat maps 441 and the second heat maps 451 for pose estimation. Hereinafter, an example of indirectly utilizing heat maps for pose estimation will be described with reference to FIGS. 6 to 9.

FIGS. 6 to 9 illustrate examples of neural network-based methods (e.g., neural network-based pose estimation methods).

Figure 6:
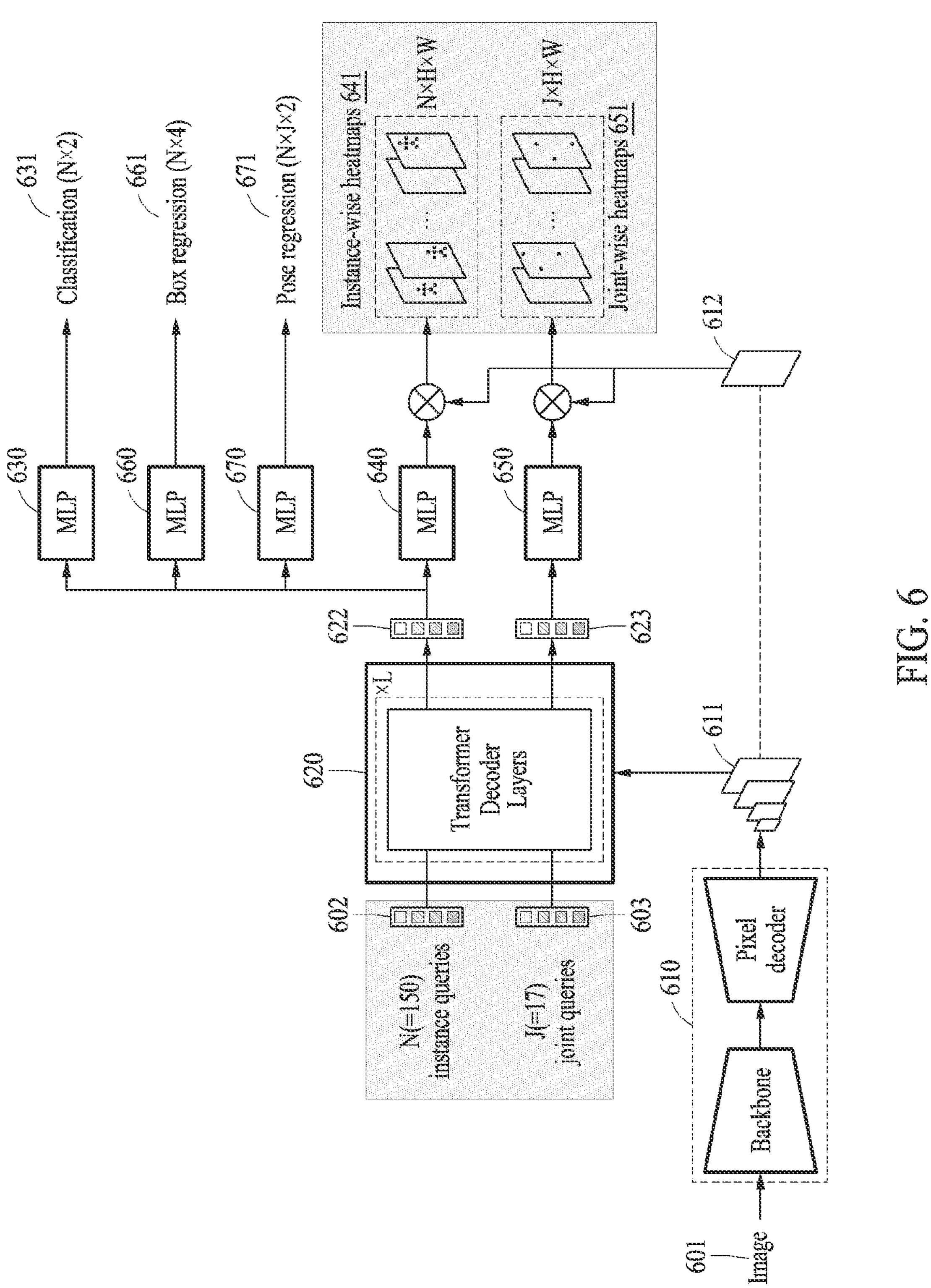
FIGS. 6 to 9 illustrate examples of neural network-based methods with pose estimation.

A processor (e.g., the processor 100 of FIG. 2) may indirectly utilize heat maps for pose estimation. Referring to FIG. 6, the processor 100 may obtain a box regression result 661 and a pose regression result 671 from an output of a transformer decoder 620 trained based on heat maps.

The configuration shown in FIG. 6 (e.g., an image, queries, a decoder, and heat maps) may be substantially the same as the configuration shown in FIG. 4. However, the processor 100 may directly obtain the box regression result 661 and the pose regression result 671 without performing pose estimation by combining heat maps 641 and 651. The heat maps 641 and 651 may be respectively generated using an MLP 640 and an MLP 650 and may be used for training the transformer decoder 620.

The processor 100 may obtain image features 611 from an image 601 based on a module 610. The processor 100 may input, to the transformer decoder 620, the image features 611 obtained based on the image 601, instance queries 602 involved in identifying objects, and joint queries 603 involved in identifying joints included in an object. The transformer decoder 620 may be trained based on first heat maps associated with objects (e.g., the first heat maps 641) and second heat maps associated with joints (e.g., the second heat maps 651).

The processor 100 may obtain output instance queries 622 and output joint queries 623 in parallel based on the transformer decoder 620. Each of the output instance queries 622 may include information on a single object identified in the image 601. Each of the output joint queries 623 may include information on a single joint identified in the image 601.

The processor 100 may estimate the respective poses of the plurality of objects included in the image 601 based on the output instance queries 622. A pose estimation result may include the box regression result 661 (e.g., bounding boxes) and the pose regression result 671. The box regression result 661 may be obtained from an MLP 660 configured to perform a box regression analysis. The pose regression result 671 may be obtained from an MLP 670 configured to perform a pose regression analysis. The pose estimation result may include an object score (e.g., an object score obtained by scoring the degree to which the result output from the transformer decoder 620 is recognized as a person). Further, the processor 100 may score each of the output instance queries 622 based on an MLP 630 to obtain object scores 631.

Figure 7:
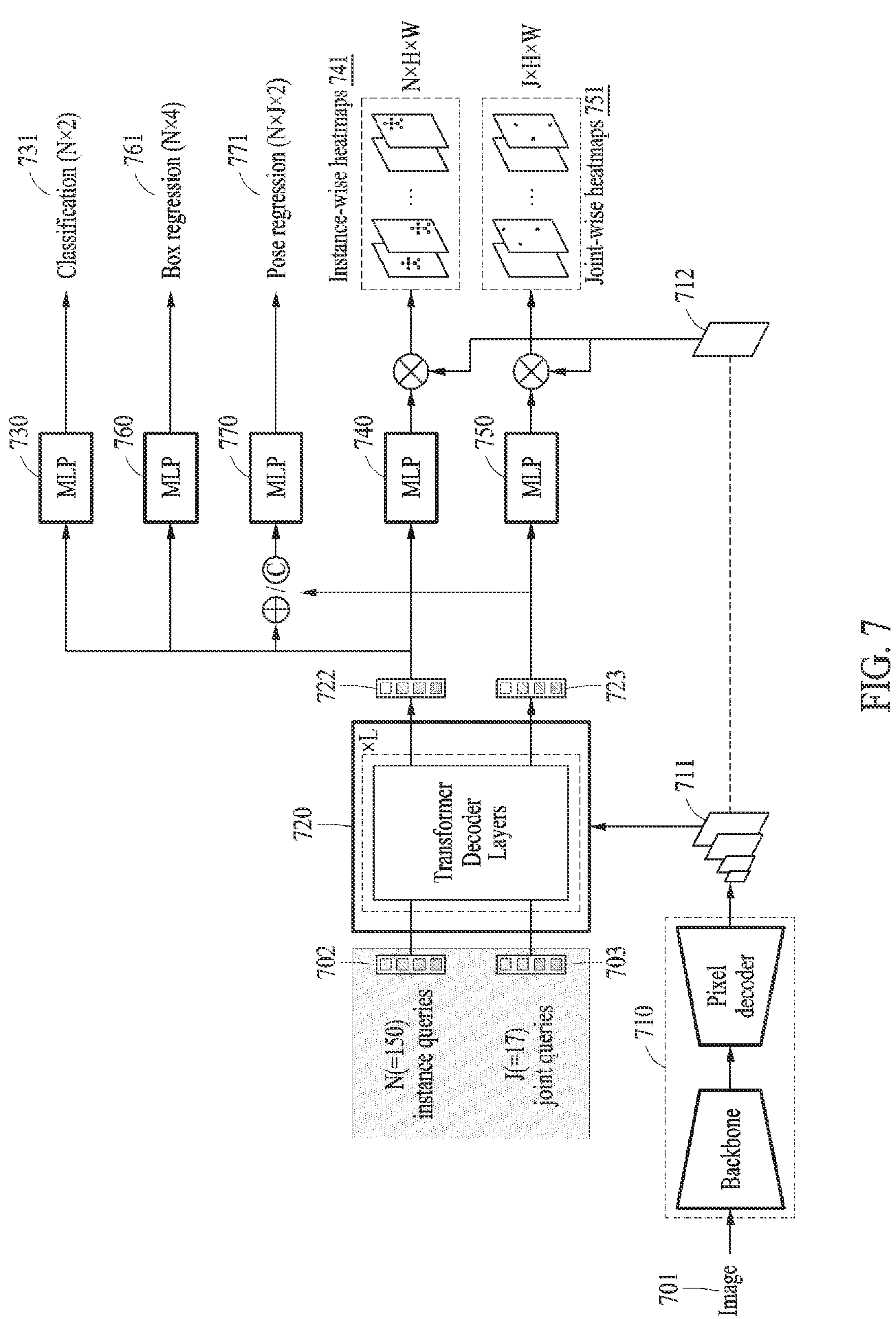

Referring to FIG. 7, the processor 100 may obtain a pose estimation result (e.g., a box regression result 761 generated using an MLP 760 and a pose regression result 771 generated using an MLP 770) from an output of a transformer decoder 720 trained based on heat maps.

The configuration shown in FIG. 7 (e.g., an image, queries, a decoder, heat maps, and MLPs) may be substantially the same as the configuration shown in FIG. 6. However, the processor 100 may use a combination of output instance queries 722 and output joint queries 723 as an input of an MLP 770 configured to perform a pose regression analysis. The combination of the output instance queries 722 and the output joint queries 723 may include an addition of the output instance queries 722 and the output joint queries 723. The combination of the output instance queries 722 and the output joint queries 723 may include a concatenation between the output instance queries 722 and the output joint queries 723. Further, the processor 100 may obtain image features 711 from an image 701 based on a module 710, the processor 100 may score each of the output instance queries 722 based on an MLP 730 to obtain object scores 731, and heat maps 741 and 751 may be respectively generated using an MLP 740 and an MLP 750 and may be used for training the transformer decoder 720.

Figure 8:
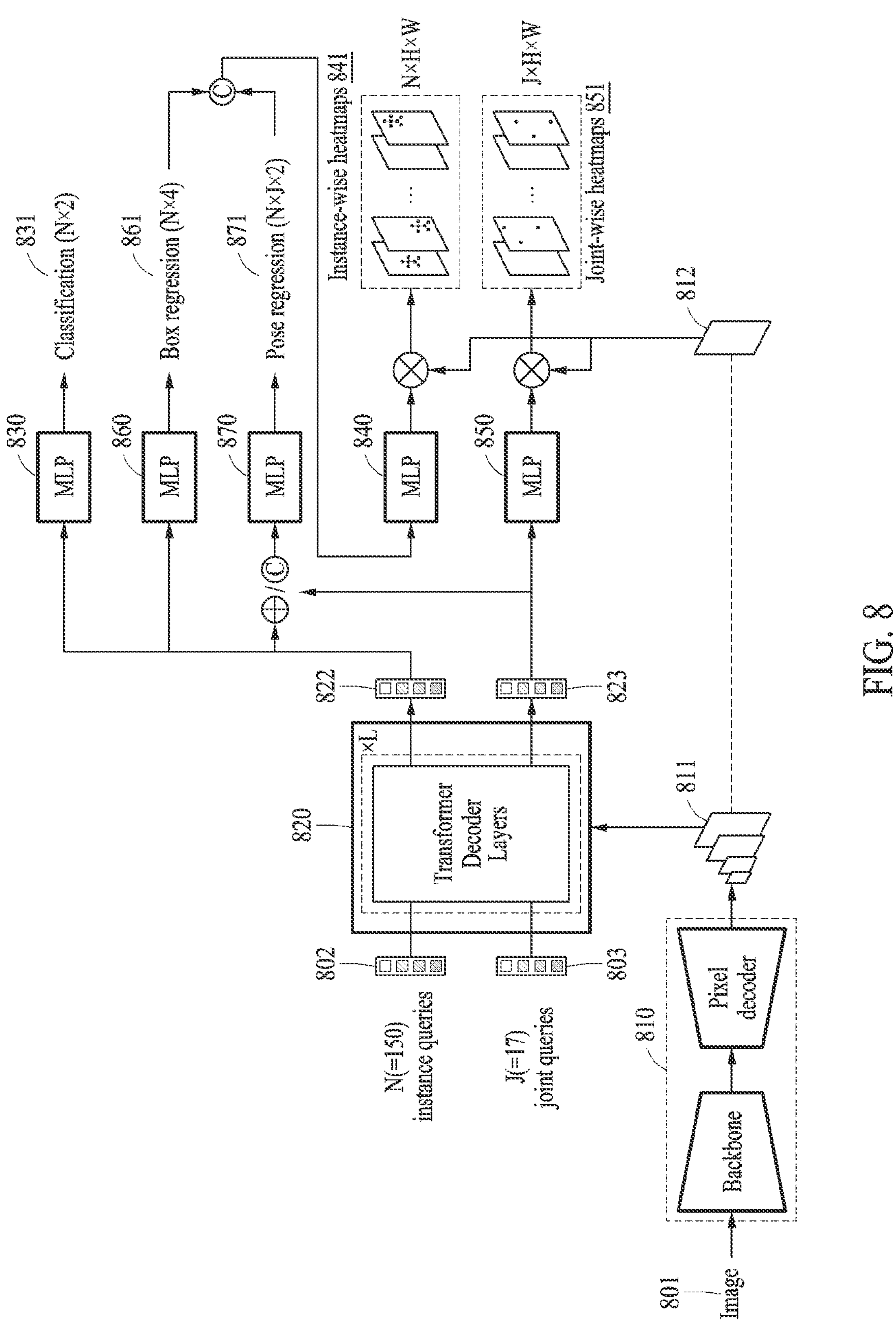

Referring to FIG. 8, the processor 100 may obtain a pose estimation result (e.g., a box regression result 861 generated using an MLP 860 and a pose regression result 871 generated using an MLP 870) from an output of a transformer decoder 820 trained based on heat maps.

The configuration shown in FIG. 8 (e.g., an image, queries, a decoder, heat maps, and MLPs) may be substantially the same as the configuration shown in FIG. 7. However, the processor 100 may be different from that in FIG. 7 in terms of the process of obtaining the heat maps (e.g., first heat maps 841 and second heat maps 851) to be used for training the transformer decoder 820.

The first heat maps (e.g., the first heat maps 841) used for training the transformer decoder 820 may be obtained based on a box regression result (e.g., the box regression result 861), a pose regression result (e.g., the pose regression result 871), and high-resolution image features (e.g., high-resolution image features 812). The second heat maps (e.g., the second heat maps 851) used for training the transformer decoder 820 may be obtained based on output joint queries (e.g., output joint queries 823) and the high-resolution image features (e.g., the high-resolution image features 812). Further, the processor 100 may obtain image features 811 from an image 801 based on a module 810, the processor 100 may score each of the output instance queries 822 based on an MLP 830 to obtain object scores 831, and the heat maps 841 and 851 may be respectively generated using an MLP 840 and an MLP 850 and may be used for training the transformer decoder 820.

Figure 9:
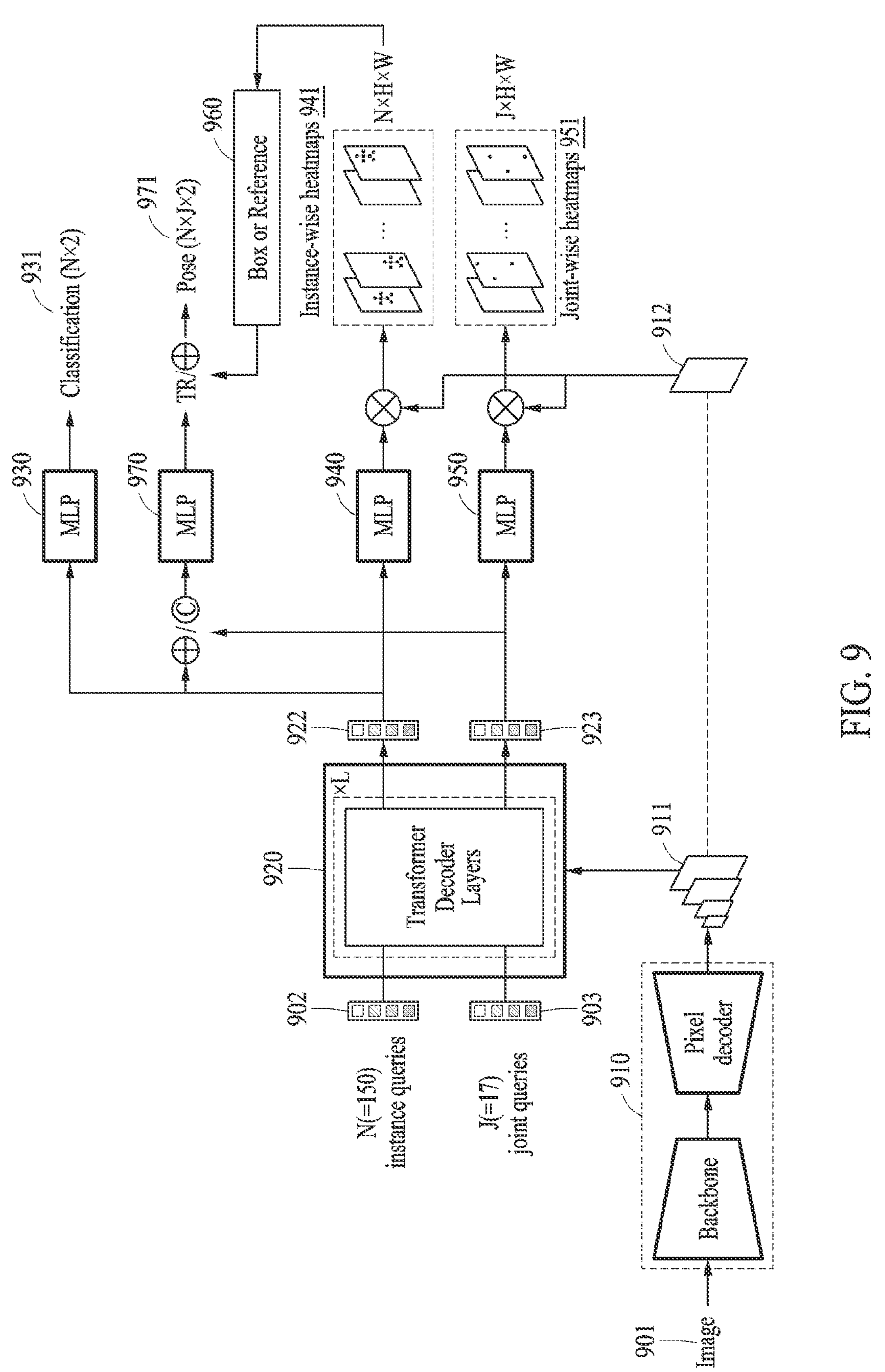

Referring to FIG. 9, the processor 100 may obtain a pose estimation result (e.g., a pose regression result 971 generated using an MLP 970 and a box or reference 960) from an output of a transformer decoder 920 trained based on heat maps.

The configuration shown in FIG. 9 (e.g., an image, queries, a decoder, and heat maps) may be substantially the same as the configuration shown in FIG. 4. However, the processor 100 may use first heat maps 941 associated with objects to obtain the pose regression result 971. The processor 100 may estimate reference points (e.g., center points of objects) or reference bounding boxes based on the first heat maps 941. The processor 100 may obtain the pose regression result 971 based on the reference points (or reference bounding boxes), output instance queries 922, and output joint queries 923. As described above, referring to FIGS. 6 to 9, the processor 100 may indirectly utilize first heat maps and second heat maps for pose estimation (e.g., output a pose regression result from an output of a decoder trained based on the first heat maps and the second heat maps). Further, the processor 100 may obtain image features 911 from an image 901 based on a module 910, the processor 100 may score each of the output instance queries 922 based on an MLP 930 to obtain object scores 931, and the heat maps 941 and 951 may be respectively generated using an MLP 940 and an MLP 950 and may be used for training the transformer decoder 920.

Figures 10, 11:
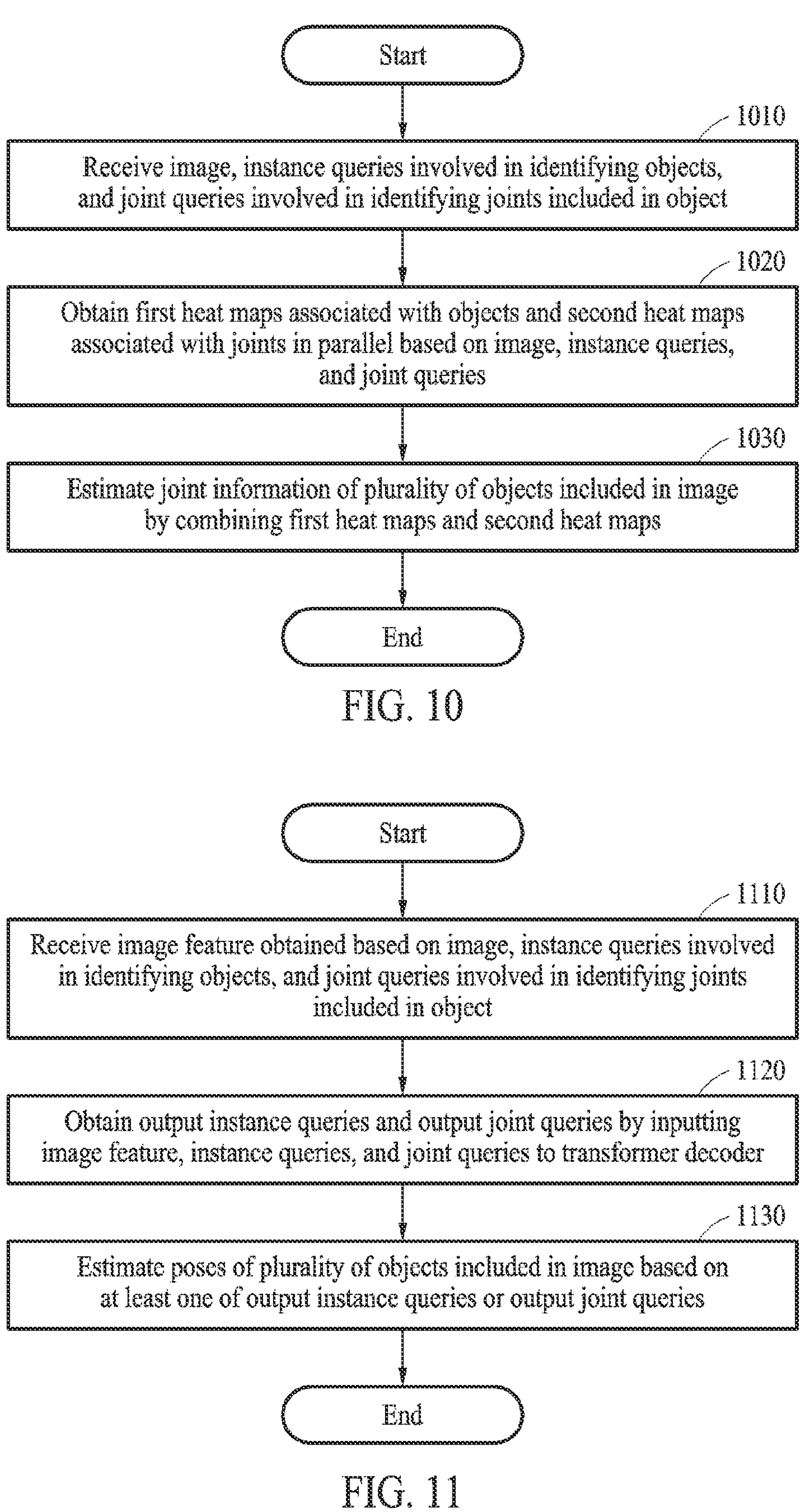
FIGS. 10 and 11 illustrate examples of methods with pose estimation.

FIGS. 10 and 11 illustrate examples of methods with pose estimation (e.g., pose estimation methods).

Referring to FIG. 10, a processor (e.g., the processor 100 of FIG. 2) may directly utilize heat maps. Operations 1010 to 1030 may be performed sequentially, but examples are not limited thereto. For example, two or more operations may be performed in parallel.

In operation 1010, the processor 100 may receive an image, instance queries involved in identifying objects, and joint queries involved in identifying joints included in an object.

In operation 1020, the processor 100 may obtain first heat maps associated with objects and second heat maps associated with joints in parallel based on the image, the instance queries, and the joint queries. The first heat maps and the second heat maps may correspond to two-dimensional images representing a possibility or probability that a joint is present at each pixel location. Each of the first heat maps may include information of a single object. Each of the first heat maps may include information on positions of all joints of any one of a plurality of objects. Each of the second heat maps may include information on a single joint. Each of the second heat maps may include information on positions of single joints respectively included in the plurality of objects.

In operation 1030, the processor 100 may estimate respective joint information of a plurality of objects included in the image by combining the first heat maps and the second heat maps. The joint information may include coordinates of a joint and a probability that a joint is present at the coordinates. The processor 100 may estimate poses of the plurality of objects included in the image based on coordinates of a joint having the presence probability greater than a threshold value.

Referring to FIG. 11, the processor 100 may indirectly utilize heat maps. Operations 1110 to 1130 may be performed sequentially, but examples are not limited thereto. For example, two or more operations may be performed in parallel.

In operation 1110, the processor 100 may receive image features obtained based on an image, instance queries involved in identifying objects, and joint queries involved in identifying joints included in an object.

In operation 1120, the processor 100 may obtain output instance queries and output joint queries in parallel by inputting the image feature, the instance queries, and the joint queries to a transformer decoder.

In operation 1130, the processor 100 may estimate respective poses of a plurality of objects included in the image based on at least one of the output instance queries or the output joint queries.

The pose estimation apparatuses, processors, memories, modules, transformer decoders, MLPs, pose estimation apparatus 10, processor 100, memory 200, module 410, transformer decoder 420, MLP 430, MLP 440, MLP 450, module 610, transformer decoder 620, MLP 630, MLP 640, MLP 650, MLP 660, MLP 670, module 710, transformer decoder 720, MLP 730, MLP 740, MLP 750, MLP 760, MLP 770, module 810, transformer decoder 820, MLP 830, MLP 840, MLP 850, MLP 860, MLP 870, module 910, transformer decoder 920, MLP 930, MLP 940, MLP 950, MLP 970, and other apparatuses, devices, units, modules, and components disclosed and described herein with respect to FIGS. 1-11 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method with pose estimation, the method comprising:

receiving an image, instance queries for object identification, and joint queries for joint identification;

generating first heat maps each associated with a plurality of joints included in a respective one of a plurality of objects and second heat maps each associated with a single type of joint included in each of the plurality of objects in parallel based on the image, the instance queries, and the joint queries; and estimating respective joint information of the plurality of objects included in the image by combining the first heat maps and the second heat maps.

2. The method of claim 1, wherein each of the first heat maps comprises information on positions of all joints of any one of the plurality of objects, and each of the second heat maps comprises information on a position of the single type of joint included in any one of the plurality of objects.

3. The method of claim 1, wherein the first heat maps and the second heat maps correspond to two-dimensional images representing a probability that a joint is present at each pixel location.

4. The method of claim 1, wherein the generating in parallel comprises:

generating an image feature based on the image; and generating output instance queries and output joint queries by inputting the image feature, the instance queries, and the joint queries to a transformer decoder.

5. The method of claim 4, wherein each of the output instance queries comprises information on a single object identified in the image, and each of the output joint queries comprises information on the single type of joint identified in the image.

6. The method of claim 4, wherein multi-head self-attention is performed on the instance queries and the joint queries through the transformer decoder.

7. The method of claim 4, wherein the transformer decoder comprises a plurality of layers, and the instance queries and the joint queries are gradually updated by sequentially passing through the plurality of layers to generate the output instance queries and the output joint queries.

8. The method of claim 4, wherein the generating in parallel further comprises:

generating a high-resolution image feature based on the image feature;

generating the first heat maps based on the high-resolution image feature and the output instance queries;

generating the second heat maps based on the high-resolution image feature and the output joint queries; and generating an object score by scoring each of the output instance queries.

9. The method of claim 1, wherein the estimating comprises estimating the respective joint information of the plurality of objects by multiplying first heat maps having an object score greater than or equal to a threshold value by the second heat maps.

10. The method of claim 1, wherein the joint information comprises coordinates of a joint and a probability that a joint is present at the coordinates, and the pose estimation method further comprises estimating poses of the plurality of objects included in the image based on coordinates of a joint having the probability greater than a threshold value.

11. A processor-implemented method with pose estimation, the method comprising:

receiving an image feature generated based on an image, instance queries for object identification, and joint queries for joint identification;

generating output instance queries and output joint queries in parallel by inputting the image feature, the instance queries, and the joint queries to a transformer decoder trained based on first heat maps each associated with a plurality of joints included in a respective one of a plurality of objects and second heat maps each associated with a single type of joint included in each of the plurality of objects; and estimating respective poses of a plurality of objects included in the image based on either one or both of the output instance queries and the output joint queries.

12. The method of claim 11, wherein the transformer decoder is trained based on the first heat maps associated with the objects and the second heat maps associated with the joints.

13. The method of claim 12, wherein the first heat maps and the second heat maps correspond to two-dimensional images representing a probability that a joint is present at each pixel location.

14. The method of claim 12, wherein the estimating of the respective poses comprises generating a box regression result and a pose regression result based on the output instance queries.

15. The method of claim 12, wherein the estimating of the respective poses comprises:

generating a box regression result based on the output instance queries; and generating a pose regression result based on a combination of the output instance queries and the output joint queries.

16. The method of claim 15, wherein the first heat maps are generated based on the box regression result, the pose regression result, and a high-resolution image feature, and the second heat maps are generated based on the high-resolution image feature and the output instance queries.

17. The method of claim 11, wherein each of the output instance queries comprises information on a single object identified in the image, and each of the output joint queries comprises information on the single type of joint identified in the image.

18. The method of claim 11, wherein the estimating of the respective poses comprises:

generating a high-resolution image feature based on the image feature;

generating first heat maps associated with objects based on the high-resolution image feature and the output instance queries; and generating second heat maps associated with joints based on the high-resolution image feature and the output joint queries.

19. The method of claim 18, wherein the estimating of the respective poses further comprises:

estimating reference points based on the first heat maps; and generating a pose regression result based on the reference points, the output instance queries, and the output joint queries.

20. An apparatus with pose estimation, the apparatus comprising:

one or more processors configured to:

receive an image, instance queries for object identification, and joint queries for joint identification;

generate first heat maps each associated with a plurality of joints included in a respective one of a plurality of objects and second heat maps each associated with a single type of joint included in each of the plurality of objects in parallel based on the image, the instance queries, and the joint queries; and estimate respective joint information of the plurality of objects included in the image by combining the first heat maps and the second heat maps.

* * * * *